United States Patent [19]

Breen

[11] Patent Number: 5,411,322
[45] Date of Patent: May 2, 1995

[54] METHOD AND APPARATUS FOR MAXIMIZING VEHICLE BRAKING EFFECTIVENESS AND CONTROL

[75] Inventor: Michael T. Breen, Garden City, Mich.

[73] Assignee: Eaton Corporation, Cleveland, Ohio

[21] Appl. No.: 114,653

[22] Filed: Aug. 31, 1993

[51] Int. Cl.$^6$ .............................................. B60T 13/00
[52] U.S. Cl. ........................................ 303/7; 303/100; 364/426.02
[58] Field of Search ...................... 303/100, 95, 103, 7, 303/3, 10, 11, 15, 20, 115.4; 364/426.02; 188/181 R

[56] References Cited

U.S. PATENT DOCUMENTS

| | | | |
|---|---|---|---|
| 4,715,662 | 12/1987 | van Zanten et al. | 303/100 X |
| 4,758,053 | 7/1988 | Yasuno | 303/91 |
| 4,794,538 | 12/1988 | Cao et al. | 303/95 X |
| 4,848,851 | 7/1989 | Kuraoka et al. | 303/100 |
| 4,998,593 | 3/1991 | Karnopp et al. | 303/100 X |
| 5,108,158 | 4/1992 | Breen | 303/100 X |
| 5,188,434 | 2/1993 | Ruf et al. | |

Primary Examiner—Robert J. Oberleitner
Assistant Examiner—Lee W. Young
Attorney, Agent, or Firm—Brooks & Kushman

[57] ABSTRACT

Optimum braking effectiveness and control of a vehicle are obtained by continually evaluating estimated values of friction coefficients as they increase with decreasing vehicle velocity during vehicle braking and by increasing brake pressure accordingly to maintain the pressure just under a value at which vehicle control is compromised. This is enhanced by determining a maximum pressure that can be applied to each brake sight while maintaining the rate of change of the articulation angle between a tractor and trailer of the vehicle equal to zero. A further enhancement is obtained by estimating critical vehicle velocity as a function of steering angle, thus enabling braking effectiveness and control to be a function of maneuvering conditions.

5 Claims, 2 Drawing Sheets

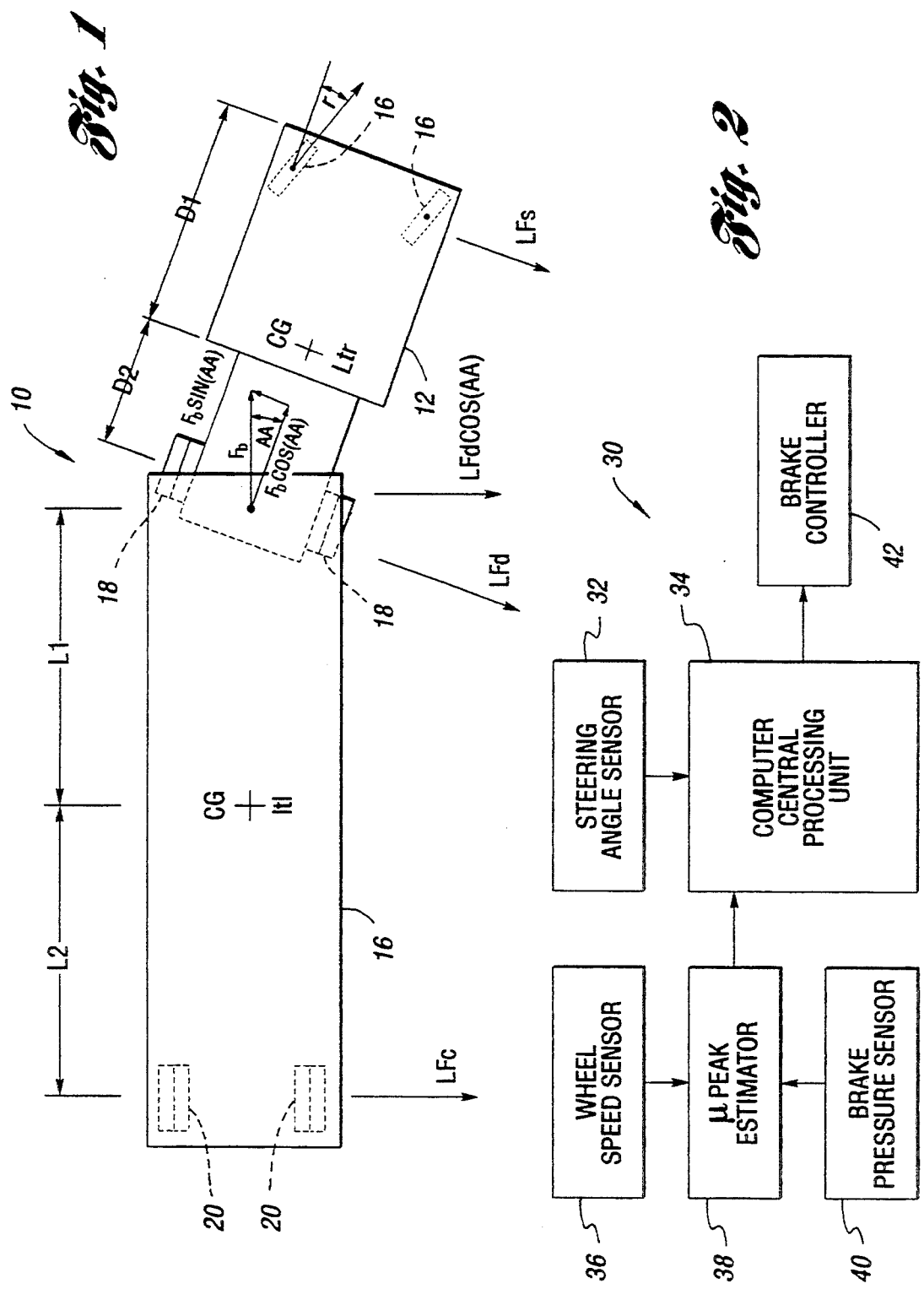

METHOD AND APPARATUS FOR MAXIMIZING VEHICLE BRAKING EFFECTIVENESS AND CONTROL

TECHNICAL FIELD

This invention relates to centrally controlled fluid-pressure braking apparatus and methods for maximizing vehicle braking effectiveness and control.

BACKGROUND INFORMATION

When braking in a straight line, factors that are a function of longitudinal vehicle dynamics are considered when trying to attain optimum vehicle braking effectiveness while maintaining optimum vehicle control. At any given position, there is a total amount of friction between the wheels and the surface of a road. When braking in a straight line, essentially all that friction is available for stopping the vehicle. When braking while turning, however, some of that friction is required to keep the wheels from sliding sideways. This condition results in a jackknife if the tractor drive wheels slip too much or trailer sway if the trailer wheels slip too much. Whatever friction is used to counteract lateral wheel slip is, of course, not available to counteract longitudinal wheel slip.

Antilock braking systems have used factors that are a function of longitudinal vehicle dynamics in trying to attain optimum vehicle braking effectiveness while maintaining optimum vehicle control. Such systems determine at least vehicle and wheel speeds and control the pressure applied to vehicle brakes to restrict wheel slippage to an effective level.

Commonly, antilock braking systems attempt to maintain an average, preset wheel slip during braking. Such system designs dictate performance compromises between providing minimum-distance braking on straight paths and optimizing vehicle control during braking on curved paths, especially at relatively high velocities.

Somewhat more sophisticated antilock braking systems have included, in the factors used to control the application of brake pressure most effectively, factors that are a function of lateral as well as longitudinal vehicle dynamics. Such factors are applicable in situations where the vehicle is braked while on a curve or while otherwise turning.

U.S. Pat. No. 4,758,053, issued to Yasuno et al., discloses an automotive vehicle antiskid brake control system that includes a hydraulic brake circuit that increases and distributes brake fluid pressure to wheel cylinders in response to a manual braking operation. A pressure control valve unit is also included and allows wheel cylinder brake fluid pressure either to increase in response to the manual braking operation or to decrease.

Sensors generate angular wheel velocity and lateral force signals that are used by a controller to derive a control signal that operates the pressure control valve unit. The controller derives a wheel slippage value based on the angular wheel velocity signal and directs the pressure control valve unit to decrease brake fluid pressure to the wheel cylinders when the wheel slippage value exceeds a reference wheel slippage value. The controller derives the reference wheel slippage value based on the lateral force signal and decreases the reference wheel slippage value when the lateral force signal exceeds a predetermined value.

U.S. Pat. No. 5,188,434, issued to Ruf et al., discloses a vehicle brake pressure controller that regulates brake fluid pressure in each wheel cylinder according to a comparison of instantaneous slip values to variable desired slip values. The desired slip values are varied as a function of the angle of inclination of one wheel of each axle.

While each of these braking systems functions with a certain degree of efficiency, none disclose the advantages of the improved method and apparatus for increasing control of a braking vehicle of the present invention as is hereinafter more fully described.

DISCLOSURE OF THE INVENTION

An object of the present invention is to provide an improved apparatus and method for providing optimum braking, without compromising control of a braking vehicle, by determining and applying optimum effective braking force when lateral as well as longitudinal forces are acting on the vehicle.

Another object of the present invention is to continually determine values of the coefficient of friction during a period of braking and to adjust brake pressure accordingly to optimize braking effectiveness.

Yet another object of the present invention is to continually determine values of the rate of change of the articulation angle between a tractor and a trailer of a vehicle during the period of braking and to adjust brake pressure accordingly to maintain the rate of change equal to zero, thus further optimizing braking effectiveness.

Still another object of the present invention is to continually determine values of the ratio of actual vehicle velocity to critical vehicle velocity during the period of braking, critical vehicle velocity being determined as a function of steering angle, and to adjust brake pressure accordingly to further optimize braking effectiveness as a function of maneuvering conditions.

In realizing the aforementioned and other objects, a first preferred embodiment of the apparatus of the present invention includes apparatus for determining and applying maximum effective braking force to the brakes of a vehicle when lateral and longitudinal forces, such as those encountered when a vehicle is being braked while rounding a curve or otherwise turning, are acting on the vehicle. The apparatus includes a steering angle sensor that determines angular disposition, or steering angle $\gamma$, of a steer wheel and generates a turning radius signal representative of a turning radius associated with the angular disposition of the steer wheel and the vehicle's forward velocity.

The apparatus also includes a coefficient of friction ($\mu_{PEAK}$) estimator to estimate road-tire coefficient of friction and to generate a $\mu_{PEAK}$ signal representative thereof. A computer central processing unit receives the turning radius signal from the steering angle sensor and the $\mu_{PEAK}$ signal from the coefficient of friction ($\mu_{PEAK}$) estimator and generates a calculated brake pressure signal representative of a brake pressure that will apply the brakes to provide optimum braking while maintaining optimum vehicle control with respect to all the relevant variables in effect at the time.

Also included in the apparatus is a wheel speed sensor that determines the angular velocity of a wheel, generates a wheel speed signal representative of the angular velocity and communicates the wheel speed signal to the coefficient of friction ($\mu_{PEAK}$) estimator. A brake pressure sensor determines actual brake pressure, generates an actual brake pressure signal representative of the actual brake pressure and communicates the actual brake pressure signal to the coefficient of friction ($\mu_{PEAK}$) estimator.

Using data from the wheel speed signal and the actual brake pressure signal, the coefficient of friction ($\mu_{PEAK}$) estimator estimates the road-tire coefficient of friction as a function of wheel deceleration and brake pressure and generates a signal representative of the road-tire coefficient of friction. Using data from the turning radius signal and the $\mu_{PEAK}$ signal, the computer central processing unit estimates values of the braking component of the coefficient of friction and generates a calculated brake pressure signal representative of an optimum effective brake pressure. A brake controller receives the calculated brake pressure signal and controls brakes to optimize braking effectiveness while maintaining vehicle control.

The first preferred embodiment of the present invention thus improves braking effectiveness by continually evaluating the value of the friction coefficient as it varies with decreasing vehicle velocity and by increasing the brake pressure accordingly, maintaining the brake pressure just under that value at which vehicle control is compromised.

A second preferred embodiment of the apparatus of the present invention also includes an articulation angle sensor to determine the angle between the longitudinal axes of the tractor and the trailer and to generate and communicate to the computer central processing unit an articulation angle signal representative thereof.

The central processing unit calculates values of articulation angular acceleration, considers the current value of the articulation angle, the values of the moment arm lengths of forces acting about centers of gravities of the trailer and tractor, the known or estimated values of the inertias of the trailer and tractor, the coefficient of friction, and the maximum lateral forces acting on the trailer and tractor and determines a maximum pressure that can be applied to each brake sight while maintaining the articulation angular acceleration equal to zero.

The second preferred embodiment thus enhances the first embodiment by determining a maximum pressure that can be applied to each brake sight while maintaining articulation angular acceleration equal to zero.

A third preferred embodiment of the apparatus of the present invention enhances the first two embodiments by estimating critical vehicle velocity as a function of steering angle, thus enabling the braking system to consider maneuvering conditions when optimizing braking effectiveness and vehicle control.

The objects of the present invention are readily apparent from the following detailed description of the best mode for carrying out the invention when taken in connection with the accompanying drawing.

BRIEF DESCRIPTION OF THE DRAWING

A more complete appreciation of the invention and many of the attendant advantages thereof may be readily attained by reference to the following detailed description when considered with the accompanying drawings in which like reference characters indicate corresponding parts in all the views, wherein:

FIG. 1 is a symbolic plan view, partially in phantom, of a tractor-trailer vehicle shown in an articulated condition typical of such a vehicle when negotiating a curve and indicating effective braking, lateral and inertial forces acting thereon;

FIG. 2 is a schematic view of a first preferred embodiment of the apparatus of the present invention.

BEST MODE FOR CARRYING OUT THE INVENTION

Figure 3:
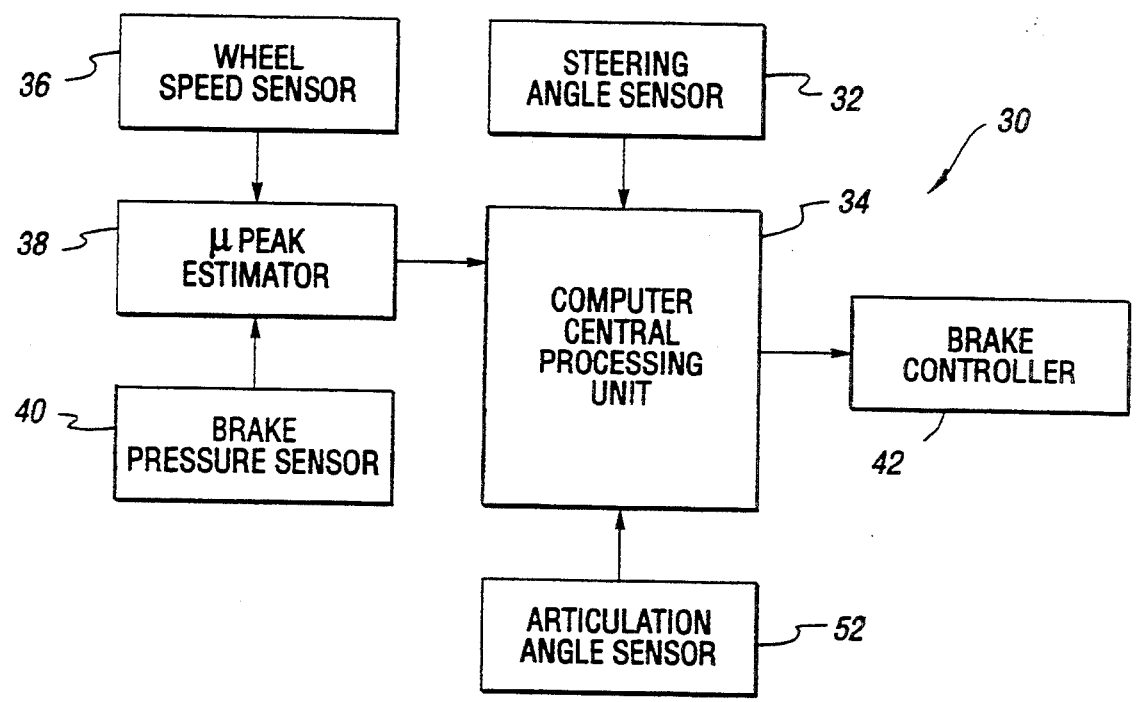
FIG. 3 a schematic view of a second preferred embodiment of the apparatus of the present invention.

FIG. 1 of the drawing shows a vehicle, generally indicated by reference numeral 10, having a tractor 12 and a trailer 14. The tractor and trailer are shown in an articulated condition typical of such a vehicle 10 when negotiating a curve or a turn. An articulation angle is indicated by characters AA and represents the angle formed between the longitudinal direction of the tractor 12 with respect to the longitudinal direction of the trailer 14.

Steer wheels 16 are shown mounted proximate the front end of the tractor 12 and turned through an angle $\gamma$ with respect to the longitudinal direction of the tractor 12. It should be noted that, in this description of the invention, the term "steer wheels" refers to wheels 16 that are steerably mounted on the tractor 12 rather than to a "steering wheel" manipulated directly by a driver of the vehicle 10. Drive wheels 18 are shown mounted proximate the rear end of the tractor 2, and trailer wheels 20 are shown mounted proximate the rear end of the trailer.

Also shown in FIG. 1 are reference symbols representing various dimensions, centers of gravity, force vectors, and inertia associated with the tractor 12 and the trailer 14. D1 represents the distance between the steer wheels 16 of the tractor 12 and the tractor center of gravity CG, and D2 represents the distance between the center of gravity CG and the drive wheels 18. L1 represents the distance between the drive wheels 18 of the tractor 12 and the center of gravity CG of the trailer, and L2 represents the distance between the trailer center of gravity CG and the trailer wheels 20.

$I_{tr}$ represents the inertia of the tractor 12 and is effectively located at the center of gravity CG of the tractor 12. $I_{tl}$ represents the inertia of the trailer 14 and is effectively located at the center of gravity CG of the tractor 14. $F_b$ represents braking forces; and LF represents lateral forces, the subscripts s, d and t identifying them as forces acting laterally at the steer wheel, drive wheel and trailer wheel locations respectively.

For any given curve, under given conditions, there is a critical vehicle velocity $V_c$ above which control of a vehicle 10 cannot be maintained while attempting to negotiate the curve. The critical vehicle velocity is a function of the radius R of the curve, the road-tire coefficient of friction $\mu_{PEAK}$ and the acceleration g due to gravity.

$$V_c = \sqrt{R * \mu * g} \tag{1}$$

If the vehicle 10 is braked while negotiating the curve, the vehicle's forward velocity V changes with respect to time t. For a constant brake force $F_b$, the critical vehicle velocity $V_c$ is a function of the aforementioned factors, the braking force $F_b$ and the mass m of the vehicle 10. Since frictional forces must now be considered as acting in lateral as well as longitudinal directions, the coefficient of road-tire friction $\mu_{PEAK}$ must be considered as having two components. A lateral component $\mu_\perp$ is associated with lateral force, and a longitudinal component $\mu_b$ is associated with longitudinal, or braking, force $F_b$.

$$V_c = \sqrt{R*\mu_\perp*g} + \frac{F_b*t}{m} \qquad (2)$$

where:

$$F_b = \mu_b*m*g$$

$$\mu_{PEAK} = (\mu_\perp^2 + \mu_b^2)^{\frac{1}{2}}$$

The critical vehicle velocity can then be calculated in the following manner.

$$V_c = \sqrt{R*\sqrt{\mu_{PEAK}^2 - \mu_b^2}*g} + \mu_b*g*t \qquad (3)$$

Equation (3) can be solved for $\mu_b$, which is related to the brake force, with respect to time t.

$$\mu_b = \sqrt{\mu_{PEAK}^2 - \left(\frac{V_c^2}{R*g}\right)^2} \qquad (4)$$

Equation (4) demonstrates the relationship between the peak possible straight line vehicle deceleration and how it is degraded when the vehicle is maneuvering in a turn of radius R at a forward velocity $V_c$.

It is usually advantageous to maintain actual vehicle velocity at some fraction (for example, 0.9) of the critical vehicle velocity $V_c$ to ensure that control of the vehicle 10 is maintained. Prior to the application of brake pressure, the value of $V_c$ is effectively as indicated by equation (1). The actual vehicle velocity (at this instant, say, $V_{c0}$) is then the predetermined fraction of that value (for example, $0.9V_c$). This value of $V_c$ is used in equation (4) to determine, at that time, a value The value $\mu_{b0}$ is multiplied by g and t and subtracted from the initial value $V_{c0}$ of $V_c$ to produce a subsequent value $V_{c1}$. Brake pressure is adjusted to provide a vehicle velocity just below that of the value of critical vehicle velocity just determined. The value $V_{c1}$ is substituted for $V_c$ in equation (4), and a subsequent value $\mu_{b1}$ is determined. The value $\mu_{b1}$ is multiplied by g and t and subtracted from the previous value $V_{c1}$ to produce a subsequent value $V_{c2}$. Brake pressure is adjusted to provide a vehicle velocity just below that of the value of critical vehicle velocity just determined. The value $V_{c2}$ is substituted for $V_c$ in equation (4), and a subsequent value $V_{b2}$ is determined. The value $\mu_{b2}$ is multiplied by g and t and subtracted from the previous value $V_{c2}$ to produce a subsequent value $V_{c3}$. Brake pressure is adjusted to provide a vehicle velocity just below that of the value of critical vehicle velocity just determined.

The sequence is repeated rapidly and continually until the brake pressure is released or until the vehicle 10 has stopped. Equation (4) yields, for decreasing values of vehicle velocity V, increasing values of the coefficient of friction component $\mu_b$. This means that, as the vehicle velocity decreases, more and more brake force can be applied, as a function of the component $\mu_b$, without exceeding the critical vehicle velocity $V_c$ above which control of the vehicle 10 is compromised. This is also the case if the turning radius of the vehicle increases.

FIG. 2 of the drawing schematically shows a first preferred embodiment, generally indicated by reference numeral 30, of the present invention. A steering angle sensor 32 is shown connected to a computer central processing unit 34. A coefficient of friction ($\mu_{PEAK}$) estimator 38 and a brake controller 42 are also connected to the computer central processing unit 34. A wheel speed sensor 36 and a brake pressure sensor 40 are each connected to the coefficient of friction ($\mu_{PEAK}$) estimator 38.

The steering angle sensor 32 determines the angular disposition, or steering angle $\gamma$, of a steer wheel 16 (FIG. 1). The radius of a curve that the vehicle 10 is negotiating is a function of the angular disposition, or steering angle $\gamma$, of the steer wheel 16; and the steering angle sensor 32 generates a turning radius signal representative of the curve radius. The wheel speed sensor 36 determines wheel speed and generates a wheel speed signal representative thereof. The brake pressure sensor 40 determines the amount of pressure applied to vehicle brakes and generates an actual brake pressure signal representative thereof.

The coefficient of friction ($\mu_{PEAK}$) estimator 38 receives the wheel speed signal and actual brake pressure signal from the wheel speed sensor 36 and the brake pressure sensor 40 respectively. Using data represented by the signals, it estimates road-tire coefficient of friction as a function of wheel deceleration and brake pressure and generates a $\mu_{PEAK}$ signal representative thereof. The computer central processing unit 34 receives the turning radius signal from the steering angle sensor 32 and the $\mu_{PEAK}$ signal from the coefficient of friction ($\mu_{PEAK}$) estimator 38.

As already described, the sensed and estimated data are used with equations (3) and (4) to continually calculate values of the component $\mu_b$ of the road-tire coefficient of friction $\mu_{PEAK}$ so that brake pressure can be increased as the coefficient of friction increases with decreasing vehicle velocity, thus optimizing brake effectiveness while maintaining vehicle control. The computer central processing unit 34 generates a calculated brake pressure signal that is representative of the optimum effective brake pressure and communicates the signal to the brake controller 42 to control the actual brake pressure accordingly.

FIG. 3 of the drawing schematically shows a second preferred embodiment, generally indicated by reference numeral 50, of the present invention. The embodiment shown by FIG. 3 is substantially the same as that shown by FIG. 2 but further includes an articulation angle sensor 52. The latter determines the angle AA formed between the longitudinal direction of the tractor 12 and the longitudinal direction of the trailer 14 and generates an articulation angle signal representative of the angle AA and communicates it to the computer central processing unit 34.

With reference again to FIG. 1, for the vehicle 10 to negotiate a turn without braking, the following conditions must be true.

$$LF_t = m_t*\omega*R^2 \leq NF_t*\mu \qquad (5)$$

$$LF_d = m_d*\omega*R^2 \leq NF_d*\mu \qquad (6)$$

$$LF_s = m_s*\omega*R^2 \leq NF_s*\mu \qquad (7)$$

In the foregoing equations, LF denotes lateral forces, and NF denotes normal forces, acting at the trailer, drive and steer axles respectively as indicated by the subscripts t, d and s. Also, $\omega$ denotes angular velocity, m denotes mass, R denotes radius of curvature and $\mu$ denotes coefficient of friction. Note that maximum values of the lateral forces would be represented by the three equations if the lateral force (LF) in each equation is set equal ($=$) to rather than less than or equal ($\leq$) to the last set of factors (NF*$\mu$).

When the vehicle 10 is braked while negociating a turn, the tractor decelerates not only itself but also the trailer. The net difference between tractor and trailer braking force is denoted as $F_b$. Because the vehicle 10 is articulated in the turn, a component of $F_b$, namely, $F_b$ sin (AA), directly opposes $LF_d$cos (AA). Therefore, $LF_d$ cos (AA) must equal or exceed $LF_d$ sin (AA) for the vehicle 10 to negotiate the curve.

If the lateral force ($LF_d$) acting at the drive axle exceeds $NF_d$* $\mu$, the tractor drive wheels 18 will begin to slide radially outward, a phenomenon referred to as jackknifing. If the lateral force ($LF_t$) acting at the trailer axle exceeds NFt * $\mu$, the trailer wheels 20 will begin to slide radially outward, a phenomenon referred to as trailer sway. If the lateral force ($LF_s$) acting at the steer axle exceeds $NF_s$ * $\mu$, the tractor steer wheels 16 will begin to slide radially outward, a phenomenon referred to as oversteering. Since vehicle brake systems are designed so that an oversteer condition rarely occurs, it will be discussed no further.

Yaw angular acceleration $\alpha$ of the trailer 14 and yaw angular acceleration $\beta$ of the tractor 12 are also considered. When braking in a constant radius curve, the product of the yaw angular acceleration $\alpha$ and of the rotational inertia $I_{tl}$ of the trailer 14 is equal to the sum of the moments about the center of gravity of the trailer 14. The trailer moments are products of the previously described lateral forces acting about the center of gravity of the trailer 14 and of the respective distances L1 and L2 of the forces from the center of gravity.

Similarly, the product of the yaw angular acceleration $\beta$ and of the rotational inertia $I_{tr}$ of the tractor 12 is equal to the sum of the moments about the center of gravity of the tractor 12. The tractor moments are products of the previously described lateral forces acting about the center of gravity of the tractor 12 and of the respective distances D1 and D2 of the forces from the center of gravity.

$$\alpha = \frac{L1*LF_d*\cos(AA)}{I_{tl}} - \frac{L1*F_b*\sin(AA)}{I_{tl}} - \frac{LF_t*L2}{I_{tl}} \quad (8)$$

$$\beta = \frac{LF_s*D1}{I_{tr}} - \frac{D2*LF_d}{I_{tr}} + \frac{D2*F_b*\sin(AA)}{I_{tr}} \quad (9)$$

Articulation angular acceleration AAA can be obtained by subtracting yaw angular acceleration $\alpha$ of the trailer 14 from yaw angular acceleration $\beta$ of the tractor 12. Actually, since the possible vehicle conditions of being stable, jackknifing or having trailer sway are substantially mutually exclusive, the articulation angle AA changes as a function of either, but not both, the yaw angular acceleration $\alpha$ of the trailer 14 or the yaw angular acceleration $\beta$ of the tractor 12. In view of this, the articulation angular acceleration AAA can be considered to be equal to $\alpha$ when the vehicle 10 is undergoing trailer sway and to be equal to $\beta$ when the vehicle 10 is undergoing jackknifing. The articulation angular acceleration AAA is zero when the vehicle 10 is in a stable condition. Consequently, the articulation angular acceleration AAA is the parameter most indicative of vehicle instability.

Accordingly, in the second preferred embodiment, the computer central processing unit 34 considers the current value of the articulation angle AA, the values of moment arm lengths L1, L2, D1 and D2, the known or estimated values of the inertia of the trailer $I_{tl}$, the inertia of the tractor $I_{tr}$, the road-tire coefficient of friction $\mu_{PEAK}$, and the maximum lateral forces $LF_s$, $LF_d$ and $LF_t$ and determines a maximum pressure that can be applied to each brake sight while maintaining the articulation angular acceleration AAA equal to zero.

With reference again being made to FIG. 2 of the drawing, in a third embodiment of the present invention, the computer central processing unit 34 receives steering angle signals from the steering angle sensor 32 and $\mu_{PEAK}$ signals from the coefficient of friction ($\mu_{PEAK}$) estimator 38. A critical vehicle velocity $V_c$ is then continually estimated according to the following equation.

$$V_c = \sqrt{\frac{\mu_{PEAK}*g*K1}{\gamma}} \quad (10)$$

The factor $\mu_{PEAK}$ is the road-tire coefficient of friction, g is the acceleration due to gravity, K1 is a constant equal to the ratio of the steering angle $\gamma$ to the radius R of the curve and $\gamma$ is the steering angle.

The ratio ($V/V_c$) of the actual vehicle velocity V to the critical vehicle velocity $V_c$ must be kept less than unity to maintain vehicle control. The value of wheel slip is varied inversely to the value of the ratio of actual vehicle velocity V to critical vehicle velocity $V_c$ to maintain control of the vehicle while optimizing braking effectiveness. By using the steering angle $\gamma$ to calculate critical vehicle velocity $V_c$, braking effectiveness becomes a function of maneuvering conditions.

While the best mode for carrying out the invention has been described in considerable detail, those familiar with the art to which this invention relates will recognize various alternative designs and embodiments for practicing the invention as defined by the following claims.

What is claimed is:

1. A method for determining and applying optimum effective braking force to brakes of a vehicle negotiating a curve, when lateral and longitudinal forces are acting on the vehicle, the vehicle having a plurality of wheels, at least two of the wheels being steer wheels, the method comprising the steps of:

sensing the angular disposition of at least one of the steer wheels;

generating a turning radius signal representative of a turning radius associated with the angular disposition of the at least one of the steer wheels;

sensing the angular velocity of a wheel;

generating a wheel speed signal representative of the angular velocity of the wheel;

sensing actual brake pressure;

generating an actual brake pressure signal representative of the actual brake pressure;

determining, as a function of wheel deceleration and the actual brake pressure signal, an estimated value $\mu_{PEAK}$ for road-tire coefficient of friction;

generating a $\mu_{PEAK}$ signal representative of the value of road-tire coefficient of friction;

determining, in response to the turning radius signal and the $\mu_{PEAK}$ signal, an estimated value for a brake pressure that will apply the brakes to provide optimum braking effectiveness while maintaining vehicle control under prevailing conditions by determining, prior to vehicle deceleration, an initial value of critical vehicle velocity $V_c$ above which control of the vehicle cannot be maintained in the curve, the critical vehicle velocity being determined according to the following, initial equation therefor:

$$V_c = \sqrt{R*\mu*g}$$

where:
R=the radius of the curve,
$\mu$=the total coefficient of road-tire friction, and
g=acceleration due to gravity;

adjusting the brake pressure to provide a vehicle velocity just below that of the initial value of critical vehicle velocity just determined;

determining a value of the longitudinal coefficient of friction component $\mu_b$ associated with brake force according to the following equation:

$$\mu_b = \sqrt{\mu_{PEAK}^2 - \left(\frac{V_c^2}{R*g}\right)^2}$$

determining, after a time interval t from the beginning of vehicle deceleration, a subsequent value of critical vehicle velocity by multiplying the value of the previously determined longitudinal coefficient of friction component $\mu_b$ by the value of gravity g and by a time interval t and subtracting the product from the previously determined value of critical vehicle velocity;

adjusting the brake pressure to provide a vehicle velocity just below that of the subsequent value of critical vehicle velocity just determined;

determining a subsequent value of the longitudinal coefficient of friction component associated with brake force according to the equation therefor;

determining, at the end of another time interval t, a subsequent value of critical vehicle velocity by multiplying the previously determined value of the longitudinal coefficient of friction component $\mu_b$ by the value of gravity g and by a time interval t and subtracting the product from the previously determined value of critical vehicle velocity;

adjusting the brake pressure to provide a vehicle velocity just below that of the subsequent value of critical vehicle velocity just determined; and repeating the immediately preceding three steps until the brake pressure is released or until the vehicle has stopped, thereby providing optimum braking effectiveness while maintaining vehicle control under prevailing conditions by increasing brake pressure as decreasing vehicle velocity results in an increasing coefficient of friction.

2. The method as defined by claim 1, wherein the vehicle velocity is maintained at a predetermined fraction of the value of the critical vehicle velocity by reducing the initial value of critical vehicle velocity by the predetermined amount prior to the calculation of subsequent values of critical vehicle velocity and subsequent values of longitudinal coefficient components.

3. A method for determining and applying optimum effective braking force to brakes of a vehicle negotiating a curve, the vehicle having a plurality of wheels, at least two of the wheels being steer wheels, when lateral and longitudinal forces are acting on the vehicle, the method comprising the steps of:

sensing the angular disposition of at least one of the steer wheels;

generating a turning radius signal representative of a turning radius associated with the angular disposition of the at least one of the steer wheels;

sensing the angular velocity of a wheel;

generating a wheel speed signal representative of the angular velocity of the wheel;

sensing actual brake pressure;

generating an actual brake pressure signal representative of the actual brake pressure;

determining, in response to the wheel speed signal and the actual brake pressure signal, an estimated value $\mu_{PEAK}$ for road-tire coefficient of friction;

generating a $\mu_{PEAK}$ signal representative of the value of road-tire coefficient of friction;

determining, in response to the turning radius signal and the $\mu_{PEAK}$ signal, an estimated value for a brake pressure that will apply the brakes to provide optimum braking effectiveness while maintaining vehicle control under prevailing conditions;

generating a calculated brake pressure signal representative of the value of the estimated value of brake pressure;

controlling the actual brake pressure in response to the calculated brake pressure signal;

determining, in response to the turning radius signal and the $\mu_{PEAK}$ signal, critical vehicle velocity;

determining vehicle velocity from the wheel speed signal;

controlling the actual brake pressure in response to the ratio of the vehicle velocity to the critical vehicle velocity so that, as the ratio increases, wheel slip is decreased.

4. The method as defined by claim 3, wherein the critical vehicle velocity is determined by the following equation:

$$V_c = \sqrt{\frac{\mu_{PEAK}*g*K1}{\gamma}}$$

where:
K1=a constant equal to the ratio of the steering angle $\gamma$ to the radius R of the curve, and
$\gamma$=is the steering angle.

5. The method as defined by claim 3, wherein the vehicle includes a tractor and a trailer, each having a longitudinal axis, the method further comprising the steps of:

sensing an articulation angle between the longitudinal axes of the tractor and the trailer;

generating an articulation angle signal representative of the articulation angle;

determining, from changes in the articulation angle signal with respect to time, a value of articulation angular acceleration;

generating an articulation angular acceleration signal representative of the value of articulation angular acceleration; and controlling the actual brake pressure in response to nonzero values of articulation angular acceleration.

* * * * *

UNITED STATES PATENT AND TRADEMARK OFFICE
CERTIFICATE OF CORRECTION

PATENT NO. : 5,411,322

DATED : May 2, 1995

INVENTOR(S) : MICHAEL T. BREEN

It is certified that error appears in the above-identified patent and that said Letters Patent is hereby corrected as shown below:

Column 3, Line 11,    Before "signal" insert $--\mu_{PEAK}--$

Column 4, Line 27,    "2" should be --12--

Colum 5, line 42,    After "value" insert $--\mu_{bo}$ of $\mu_{b}.--$

Signed and Sealed this

Fifteenth Day of August, 1995

Attest:

BRUCE LEHMAN

*Attesting Officer*    *Commissioner of Patents and Trademarks*